(12) United States Patent
Therrien

(10) Patent No.: US 9,415,950 B1
(45) Date of Patent: Aug. 16, 2016

(54) CANT ENGAGING MEMBER MOUNTING ARRANGEMENT

(71) Applicant: FIRME COGITES INC., St-Georges (CA)

(72) Inventor: Guy Therrien, St-Georges (CA)

(73) Assignee: FIRME COGITES INC., St-Georges, QC (CA)

( * ) Notice: Subject to any disclaimer, the term of this patent is extended or adjusted under 35 U.S.C. 154(b) by 0 days.

(21) Appl. No.: 14/725,698

(22) Filed: May 29, 2015

(51) Int. Cl.
| | |
|---|---|
| *B27B 25/04* | (2006.01) |
| *B65G 47/84* | (2006.01) |
| *B65G 19/24* | (2006.01) |
| *B27B 31/00* | (2006.01) |
| *B65G 19/02* | (2006.01) |

(52) U.S. Cl.
CPC .............. *B65G 47/841* (2013.01); *B27B 25/04* (2013.01); *B27B 31/006* (2013.01); *B65G 19/02* (2013.01); *B65G 19/245* (2013.01); *B65G 2201/0282* (2013.01)

(58) Field of Classification Search
CPC ............................... B27B 31/006; B27B 25/04
See application file for complete search history.

(56) References Cited

U.S. PATENT DOCUMENTS

| | | | | |
|---|---|---|---|---|
| 6,550,605 B1* | 4/2003 | Therrien | ............... | B27B 31/006 198/413 |
| 6,659,266 B2* | 12/2003 | Therrien | ............... | B27B 31/006 198/413 |
| 6,845,862 B2* | 1/2005 | Southwick | ............ | B27B 31/006 198/539 |
| 6,880,695 B2* | 4/2005 | Suzuki | .................. | B27B 31/006 198/456 |
| 2008/0078798 A1* | 4/2008 | Gilbert | .................... | B27B 25/02 226/190 |

* cited by examiner

*Primary Examiner* — Thomas Randazzo
(74) *Attorney, Agent, or Firm* — Norton Rose Fulbright Canada LLP

(57) ABSTRACT

An anchor for mounting a cant engaging member on a belt of a conveyor, comprises a clamp having a top jaw and a bottom jaw respectively configured for engagement with a top surface and a bottom surface of the belt. The top and bottom jaws have attachment portions projecting laterally outwardly from opposed sides of the belt. Fasteners engageable with the attachment portions for drawing the top and bottom jaws tightly against the top and bottom surfaces of the belt. An anti-slip layer may be provided between the top jaw and the belt. The top jaw may be provided with stress distribution extensions forwardly and rearwardly from the fasteners for re-distributing localized stresses over a greater surface of the belt and thus avoid premature wear of the belt.

20 Claims, 6 Drawing Sheets

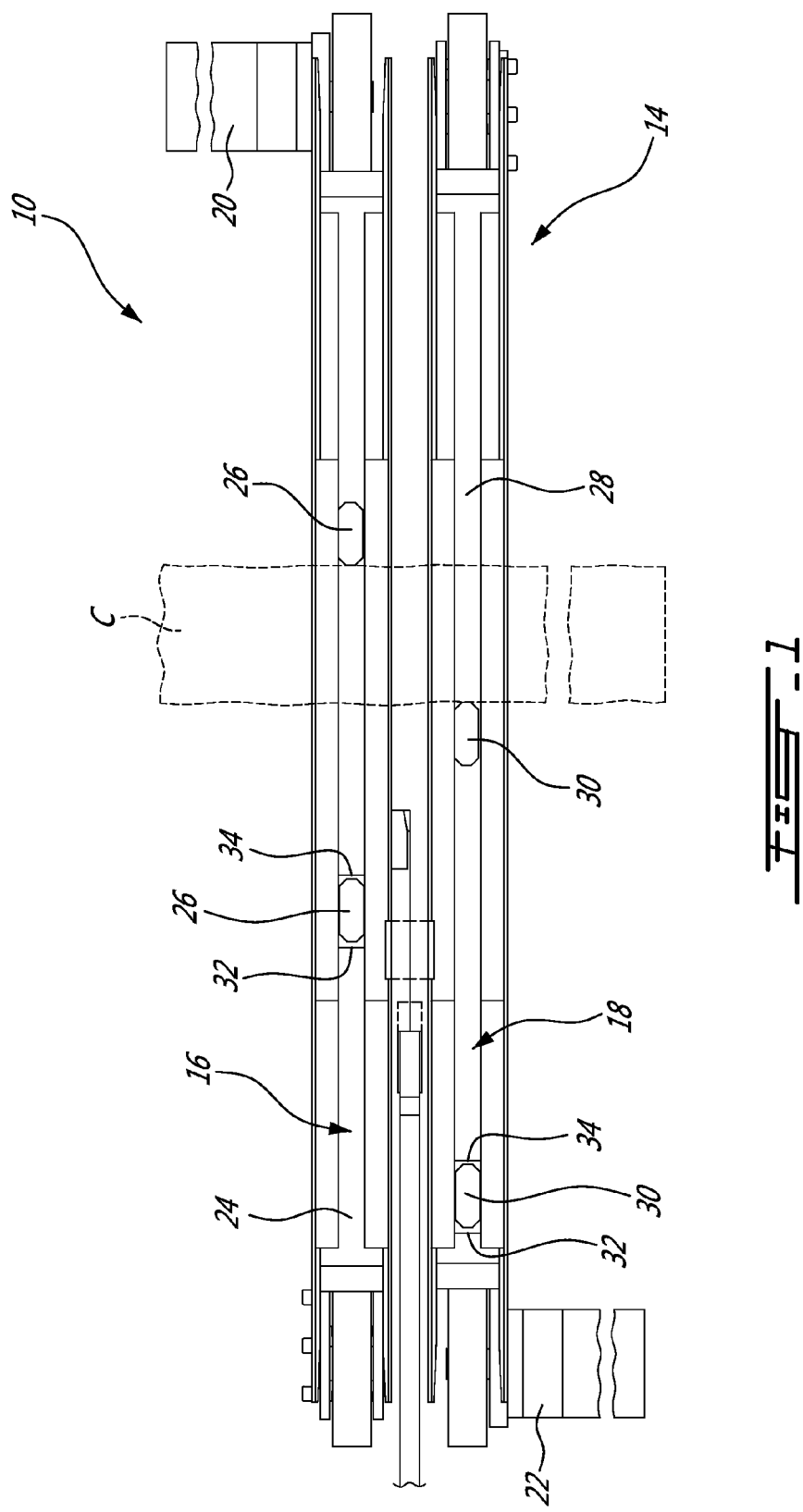

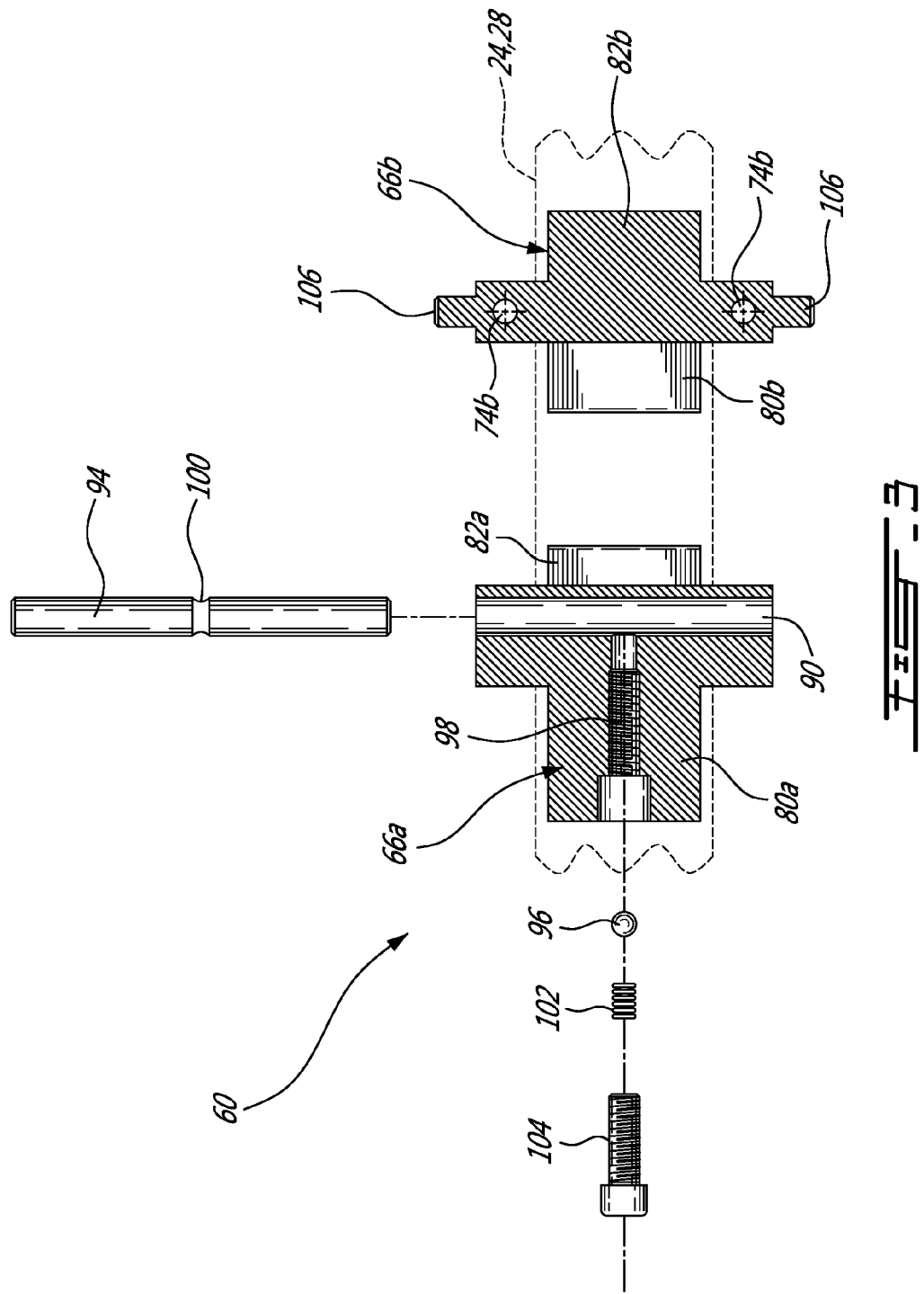

CANT ENGAGING MEMBER MOUNTING ARRANGEMENT

TECHNICAL FIELD

The present application generally relates to sawmill equipment and the like and, more particularly, to conveyors adapted to transport lumber pieces such as cants.

BACKGROUND ART

A log entering a sawmill is initially sawed into lumber pieces (hereinafter referred to as cants) having flat and parallel top and bottom surfaces but unfinished longitudinal side surfaces or wanes. The wanes of a cant may be very irregular and are usually oblique to the top and bottom surfaces thereof. The cants are run through an edger to trim the wanes such as to produce wood pieces having parallel sides which are planar and perpendicular to the top and bottom surfaces of the cants.

Conventional edgers generally comprise various transfer mechanisms which are adapted to transversally transport successive cants. For instance, a conventional edger positioning apparatus typically comprises belt conveyors having cant engaging members mounted at regular intervals on the belts of the belt conveyors. The mounting of the cants on the belt is challenging. Due to the high rotation speeds of the belt and to the forces transferred from the cant engaging members to the belt while carrying the cants, the cant engaging members need to be firmly attached to the belt. However, the mounting arrangement should not weaken or compromise the structural integrity of the belt. The mounting arrangement should not result in premature wear of the belt as a result of a shearing action of the cant engaging member on the belt. Relative movement and friction between the cant engaging members and the belt should be avoided as much as possible. The points of attachment of the cant engaging members to the belt are highly stress regions. Solutions to lessen the level of stress at the point of attachment and provide a better distribution of the loads over the surface of the belt are, thus, suitable.

SUMMARY

Therefore, in accordance with a general aspect, there is provided a belt conveyor comprising a belt extending along an axis and having opposed top and bottom surfaces, a plurality of cant engaging members distributed along the belt and projecting from the top surface of the belt for engagement with successive cants to be conveyed, anchors engageable with respective ones of the cant engaging members for individually mounting the cant engaging members to the belt, each of the anchors including a first clamp having a top jaw and a bottom jaw respectively configured for engagement with the top surface and the bottom surface of the belt, fasteners engaged with the top and bottom jaws on opposed lateral sides of the belt for selectively closing the top and bottom jaws in clamping engagement with the belt, the top jaw having forward and rearward stress distribution extensions projecting respectively axially forwardly and rearwardly relative to the fasteners, in use, the forward and rearward stress distribution extensions being engageable with the top surface of the belt, thereby distributing the stress supported by the belt while the belt is driven in rotation.

In accordance with another general aspect, there is provided an anchor for mounting a cant engaging member on a belt of a conveyor, the anchor comprising a front clamp and a rear clamp adapted to be mounted at a predetermined axial distance from one another on the belt, the front clamp and the rear clamp each including a top jaw and a bottom jaw respectively configured for engagement with a top surface and a bottom surface of the belt, the top and bottom jaws having attachment portions projecting laterally outwardly from opposed sides of the belt, and fasteners engageable with the attachment portions for drawing the top and bottom jaws tightly against the top and bottom surfaces of the belt.

In accordance with a still further general aspect, there is provided a cant engaging member for mounting on a belt of a conveyor, the cant engaging member comprising a main body having a base, an anchor releasably engageable with the base of the main body, the anchor including a first clamp having a top jaw and a bottom jaw respectively configured for engagement with a top surface and a bottom surface of the belt, and fasteners engaged with the top and bottom jaws on opposed lateral sides of the belt for selectively closing the top and bottom jaws in clamping engagement with the belt.

BRIEF DESCRIPTION OF THE DRAWINGS

Reference will now be made to the accompanying drawings, showing by way of illustration a preferred embodiment thereof, and in which:

FIG. 1 is a top plan view of a module of a belt conveyor suitable for conveying lumber pieces such as cants;

FIG. 3 is a top cross-section view of the anchor shown in FIGS. 2a and 2b;

DETAILED DESCRIPTION

Figure 2A:
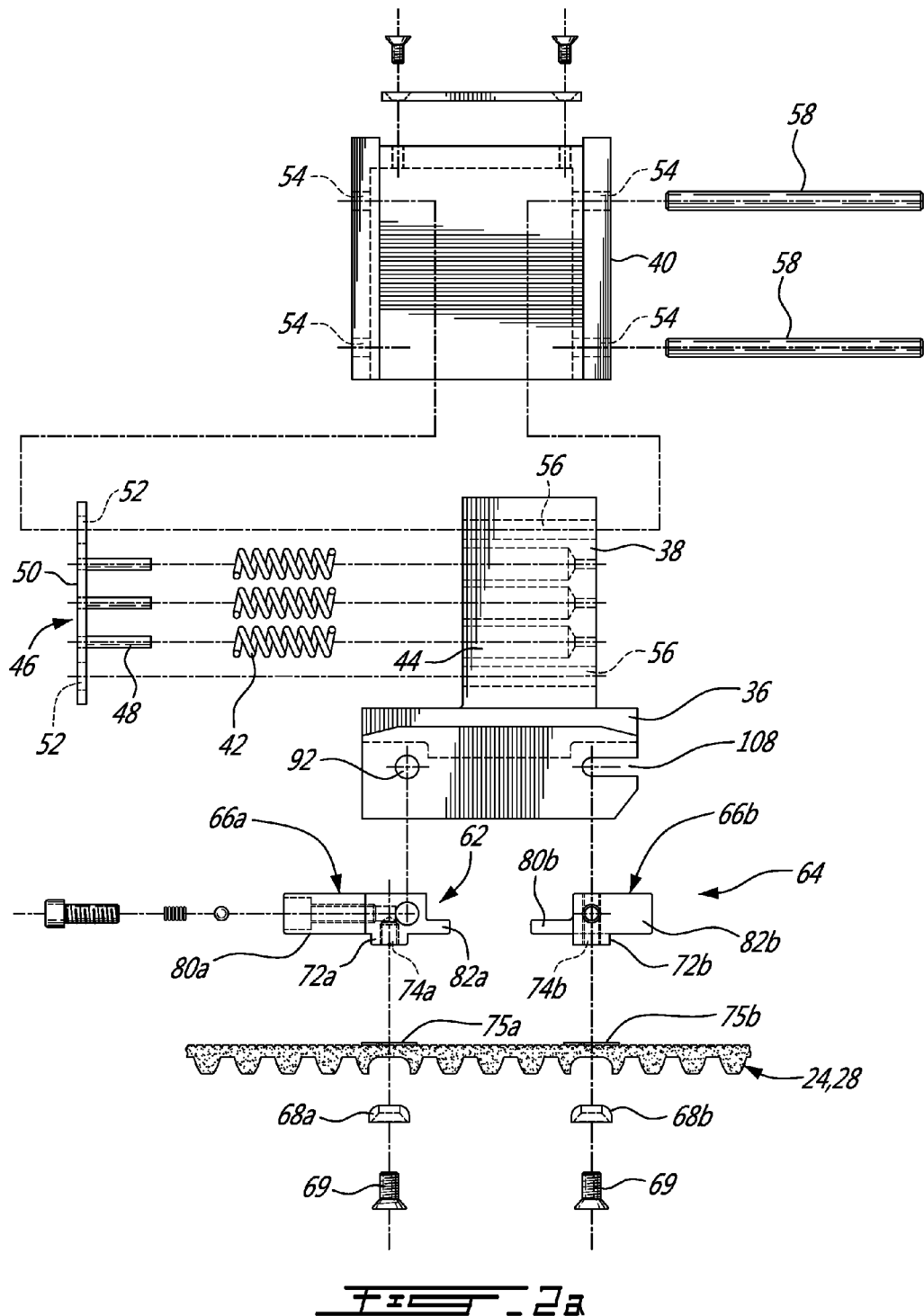
FIG. 2a is an exploded side view of a cant engaging member with its associated anchor for detachably attaching the cant engaging member to the belt of the conveyor belt shown in FIG. 1.

FIG. 1 illustrates a module 14 of an edger infeed table 10 of the type described in U.S. Pat. No. 6,550,605 issued on Apr. 22, 2003, the content of which is herein incorporated by reference.

The module 14 includes first and second side-by-side conveyors 16, 18 driven by respective reversible motors 20 and 22. The first conveyor 16 includes a belt 24 (i.e. an endless driving member) having a predetermined number of cant engaging members 26 secured at regular interval thereon. Similarly, the second conveyor 18 includes a belt 28 having a predetermined number of cant engaging members 30 secured at regular intervals thereon. Each cant engaging member 26, 30 has a front pushing side 32 and a rear abutment side 34. In operation, the cant engaging members 26, 30 alternately serve as pushing members or abutment members depending if they are positioned behind or in front of the cant C to be conveyed. The cant C is wedged between a pair of cant engaging members 26, 30, the one disposed behind the cant acting as the pushing member, whereas the one in front of the cant acts as an abutment member.

Figure 2B:
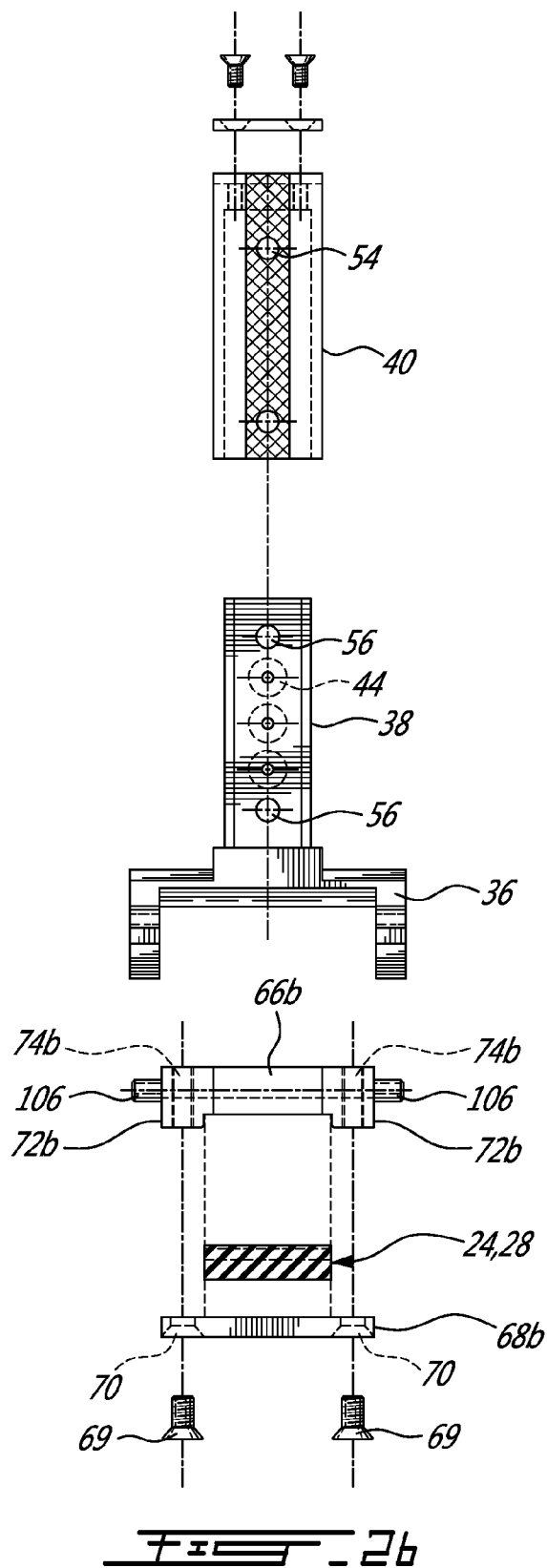
FIG. 2b is an exploded rear view of the cant engaging member and associated anchor.
Figure 4:
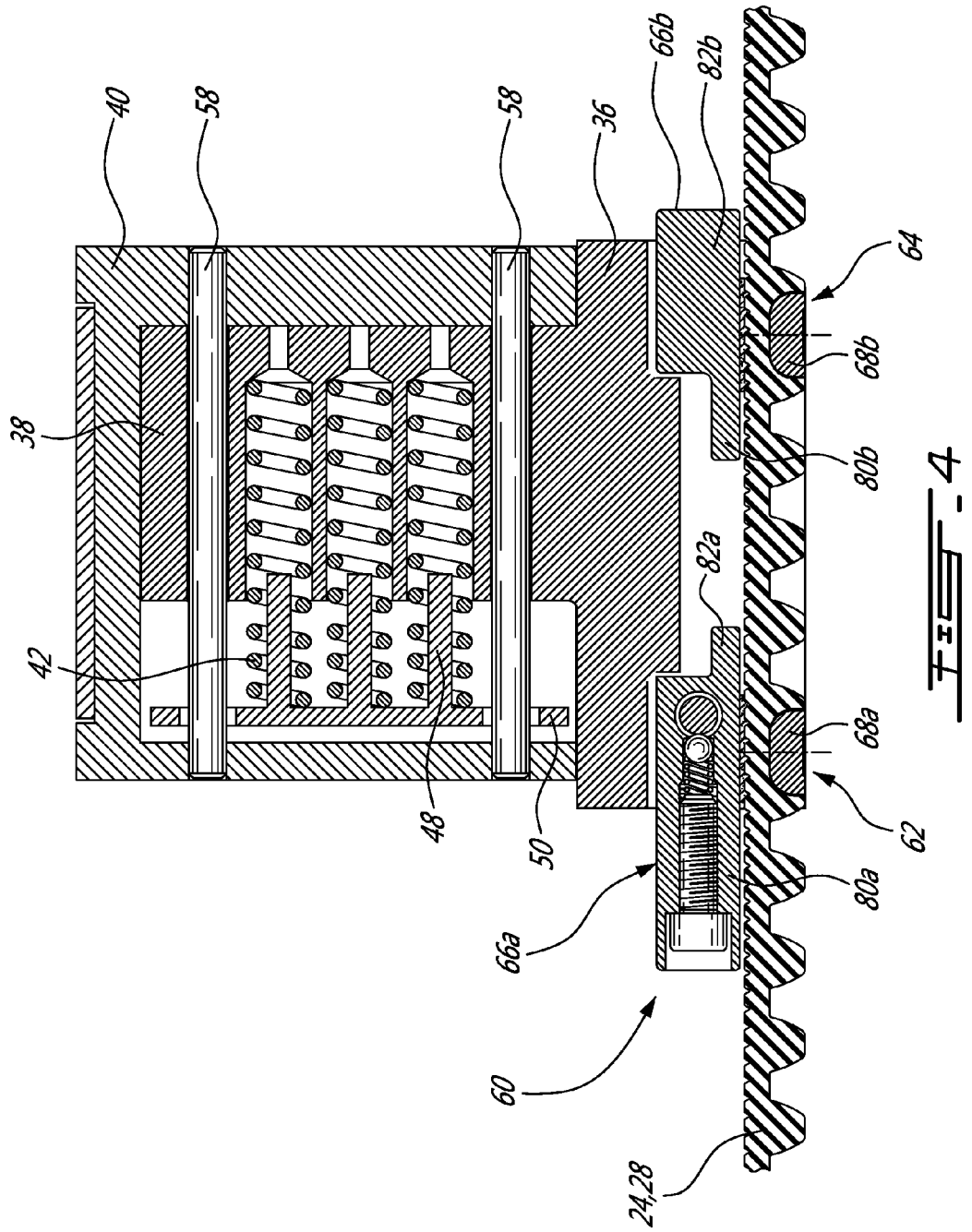
FIG. 4 is side cross-section view of the cant engaging member and the associated anchor assembled on the belt of the conveyor.

FIGS. 2a and 2b illustrate in greater details the construction of the cant engaging members 26,30. More particularly, each cant engaging member 26, 30 has a one-piece main body having a base portion 36 and an upwardly protruding portion 38 extending substantially at right angle therefrom. The base portion 36 and the upwardly protruding portion 38 may be integrally formed of a single block of polymer. According to one embodiment, the main body is made out of aluminium. However, it is understood that other suitable materials could be used as well. A cover or sleeve member 40 is fitted over the upwardly protruding member 38 and is urged in a forward position relative thereto by at least two (three in the illustrated example) compression springs 42 mounted in corresponding vertically spaced-apart seats 44 defined in a front surface of the upwardly protruding portion 38. To facilitate the assembly and disassembly of the spring loaded sleeve member 40, the spring may be mounted on a spring retainer 46. Indeed as shown in FIGS. 2a and 4, the springs 42 may be slidably mounted on pins 48 extending from a back plate 50 adapted to be positioned between the sleeve member 40 and the upwardly protruding portion 38. In this way, the springs 42 can be more easily held during installation and they can be compressed all at once to facilitate removal of the sleeve member 40 during maintenance operations.

Top and bottom holes 52 are defined in the back plate 50 for alignment with corresponding top and bottom holes 54 defined in the front and rear surfaces of the sleeve member 40 and with horizontal through bores 56 defined in the upwardly protruding portion 38 of the main body of the cant engaging member. Top and bottom pins 58 are inserted in these registering holes 52, 54 and bores 56 to guide the movement of the sleeve member 40 relative to the upwardly protruding portion 38 and prevent withdrawal of the sleeve member 40 from the main body.

The above described spring loaded front pushing side arrangement allows to compensate for inaccurate positioning of the cant engaging members 26, 30 by a control system (not shown), while still providing for a rigid rear abutment side 34 to retain the cant.

Figure 5A:
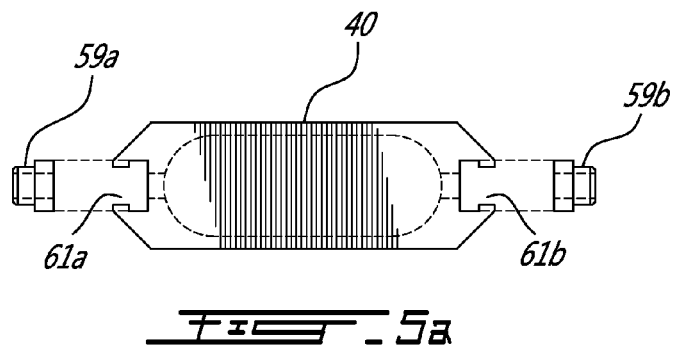
FIG. 5a is an exploded top view of a sleeve member or cover of the cant engaging member with its replaceable front and back wear plates.
Figure 5B:
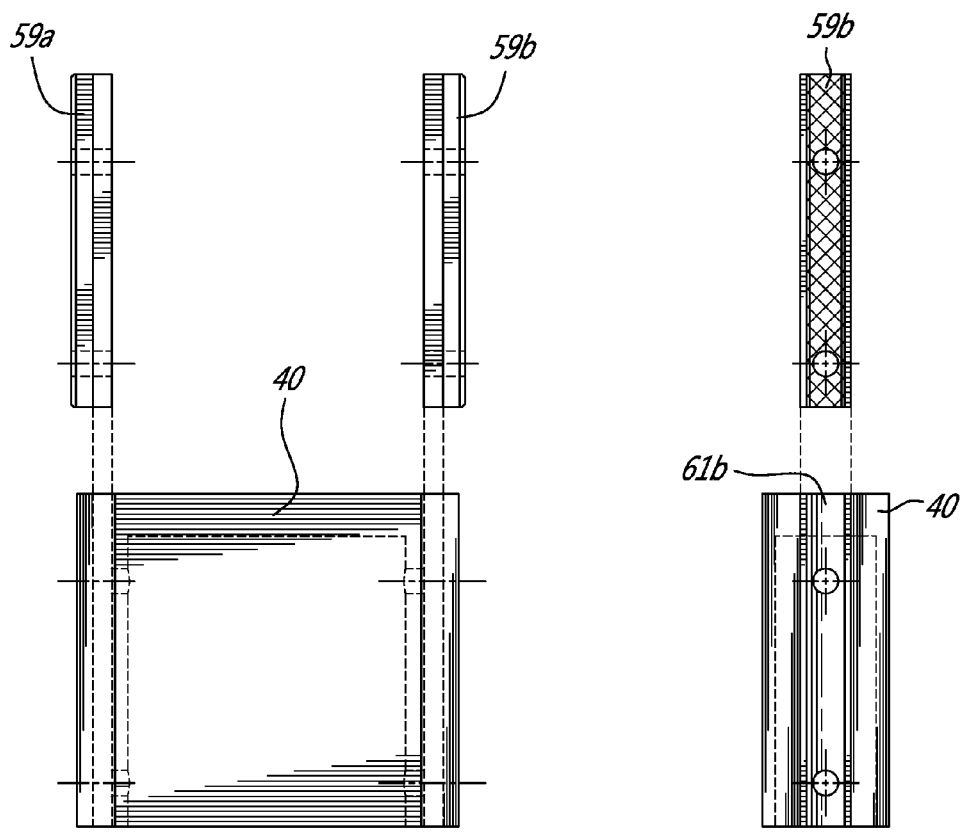
FIG. 5b is an exploded side view of the sleeve member and the wear plates.
Figure 5C:
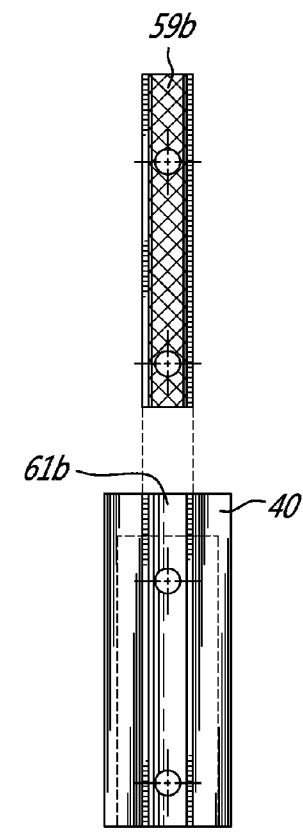
FIG. 5c is rear view of the sleeve member and of the back wear plate.

As shown in FIGS. 5a to 5c, a front wear plate 59a and a rear wear plate 59b can be respectively removably mounted on the front surface and the rear surface of the sleeve member 40. However, it is understood that according to some applications, only one of the front and rear sides of the sleeve member 40 could be provided with such a wear plate. The front and rear wear plates 59a, 59b may be vertically slid in corresponding grooves 61a, 61b defined in the front and rear surface of the sleeve member 40. The grooves 61a, 61b and the wear plates 59a, 59b may have complementary retaining profiles. According to the illustrated example, each wear plate has a T-shaped cross-section for engagement with a corresponding T-shaped groove. Screws (not shown) or other suitable fasteners could also be used to fix the wear plates 59a, 59b in position on the front and rear surfaces of the sleeve member 40.

Each cant engaging member 26, 30 is mounted to the associated belt 24, 28 by an anchor 60. According to the illustrated example, each anchor 60 generally comprises a front clamp 62 and a rear clamp 64 adapted to be mounted at a predetermined axial distance from one another on the belt 24, 28. The front clamp 62 and the rear clamp 64 each includes a top jaw 66a, 66b and a bottom jaw 68a, 68b respectively configured for engagement with a top surface and a bottom surface of the belt 24, 28. As can be appreciated from FIGS. 2a and 2b, fasteners, such as clamping screws 69 or any other suitable equivalents, are engaged with the top and bottom jaws 66a, 66b, 68a, 68b on opposed lateral sides of the belt 24,28 for selectively firmly closing the top and bottom jaws 66a, 66b, 68a, 68b in clamping engagement with the associated belt 24, 28.

As can be appreciated from FIGS. 2a and 4, the bottom jaws 68a, 68b of the front and rear clamps 62, 64 are both provided in the form of a plate configured for mating engagement between two adjacent teeth of the belt 24, 28. Holes 70 with bottom counter bore sections are defined at the laterally opposed ends of the plates for receiving the clamping screws 69.

As can be appreciated from FIGS. 2a and 3, the top jaws 66a, 66b of the front and the rear clamps 62, 64 have a different configuration. However, both the front top jaw 66a and the rear top jaw 66b have attachment portions projecting laterally outwardly from the opposed side of the belt 24, 28. The attachment portions of the front top jaw 66a and the rear top jaw 66b may be provided in the form of downwardly depending shoulders 72a, 72b having vertically extending threaded holes 74a, 74b defined therethrough for threaded engagement with the clamping screws 69. As can be appreciated from FIGS. 2a and 2b, the belt 24, 28 is accommodated between associated pair of front and rear shoulders 72a, 72b. Accordingly, the clamping screws 69 do not extend through the belt and, thus, they do not weaken the structural integrity of the belt.

As shown in FIG. 2a, front and rear anti-slip layers 75a, 75b, such as layers of glue, may be applied on the top surface of the belt 24, 28 between the shoulders 72a, 72b that is at the points of attachment of the front and rear clamps 62, 64 (i.e. at a location along the belt transversally aligned with the clamping screws 69 of the front and rear clamps 62, 64). The front anti-slip layer 75a is provided to prevent relative sliding movement between the front clamp 62 and the belt 24, 26. Likewise, the rear anti-slip layer 75b is provided to prevent relative sliding movement between the rear clamp 64 and the belt 24, 28. Accordingly, relative movements between the front and rear clamps 62, 64 and the belts 24, 28 at the points of attachment of the front and rear clamps 62, 64 is eliminated. By so eliminating a potential source of friction between the front and rear clamps 62, 64 and the belt 24, 28, the belt is less subject to premature wear and the useful life of the belt 24, 28 can thus be improved. The unification of the clamps 62, 64 and the belt 24, 28 is only done on short belt segments not along all the length of each cant engaging member and as such the flexibility of the belt is not compromised. Indeed, each cant engaging member is only connected to the belt via its front and rear clamps. The belt remains flexible between the front and rear clamps of each cant engaging member.

The anti-slip layer can take various forms. As mentioned hereinabove, it can be provided in the form of an adhesive such as glue, which will fill all the voids between the belt and the clamps. For instance, satisfactorily results have been obtained with industrial glues of the type used in auto body repair shops. One example is the glue commercialized by 3M under the trade name 3M™ Panel Bonding Adhesive 38315. The anti-slip layer could also comprise an insert adapted to embrace the shape of the teeth at the top surface of the belt without virtually creating any shearing effect. Such anti-slip insert could be bounded on the top face thereof directly to the associated top clamping jaw. The insert could be made of different layers of materials having bonding or anti-slip properties.

Now referring concurrently to FIGS. 2a and 3, it can be appreciated that both the front and rear top jaws 66a, 66b have forward and rearward stress distribution extensions 80a, 80b, 82a, 82b projecting respectively forwardly and rearwardly relative to the clamping screws 69 (i.e. the points of attachment). The forward and rearward stress distribution extensions 80a,80b, 82a, 82b are not bonded to the belt and, thus, in operation, these extensions 80a, 80b, 82a, 82b allow relative movements of the belt while offering a support for redistributing the forces supported by the belt during its rotation. The redistribution of the efforts transmitted to the belt 24, 28 reduce the likelihood of shearing the belt at the points of attachment of the front and rear clamps 62, 64. It allows to more evenly distribute the loads, which would otherwise be concentrated around the points of attachment of the clamps 62, 64 and, which could cause premature wear and rupturing of the belt 24, 28.

As shown in FIG. 3, the top jaw 66a of the front clamp 62 defines a transversal bore 90 for registry with corresponding mounting holes 92 (FIG. 2a) defined in the legs of the base portion 36 of the associated cant engaging member. A pin 94 is insertable through the mounting holes 92 and the transversal bore 90 for detachably securing the cant engaging member 26, 30 to the front clamp 62. Once the pin 94 has been inserted in position, a lock ball 96 can be loaded into a front axially extending bore 98 intersecting the transversal bore 90 for engagement with a corresponding annular seat 100 defined in the pin 94 midway between the opposed ends thereof. The lock ball 96 may be spring-loaded into the seat by a spring 102 compressed by a screw 104 threadably engaged in the front bore 98. It is understood that other pin locking mechanisms could be used as well.

Transversally extending pins 106 project integrally from opposed sides of the top jaw member 66b of the rear clamp 64 for releasable engagement in corresponding seats 108 (FIG. 2a) defined in the legs of the base portion 36 of the cant engaging member. As shown in FIG. 2a, the seats 108 can be provided in the form of a rearwardly open ended slot defined in the rear end of the legs of the base portion 36 of the main body of the cant engaging member 26, 30.

A selected cant engaging member can thus be readily attach to its associated front and rear anchors 62, 64 by rearwardly sliding the base portion 36 of the main body of the cant engaging member over the pins 106 of the rear top jaw 66b so as to engage the pins 106 in the rearwardly open grooves (seats 108) and then by inserting the front pin 94 through the mounting holes 92 and the transversal bore 90. The installation is completed by releasably securing the front pin 94 in place with the lock ball 96.

It is noted that the embodiments have been described in the context of a sawmill, since the transfer of a wood cant particularly exemplifies the problems to which the present invention is directed. However, it is understood that the invention is applicable to workpieces other than wood cants. Also, while the anchor has been described as including separate front and rear clamps, it is understood that the anchor could comprise a single clamp.

The invention claimed is:

1. A belt conveyor comprising a belt extending along an axis and having opposed top and bottom surfaces, a plurality of cant engaging members distributed along the belt and projecting from the top surface of the belt for engagement with successive cants to be conveyed, anchors engageable with respective ones of the cant engaging members for individually mounting the cant engaging members to the belt, each of the anchors including a first clamp having a top jaw and a bottom jaw respectively configured for engagement with the top surface and the bottom surface of the belt, fasteners engaged with the top and bottom jaws on opposed lateral sides of the belt for selectively closing the top and bottom jaws in clamping engagement with the belt, the top jaw having forward and rearward stress distribution extensions projecting respectively axially forwardly and rearwardly relative to the fasteners, in use, the forward and rearward stress distribution extensions being engageable with the top surface of the belt, thereby distributing the stress supported by the belt while the belt is driven in rotation.

2. The belt conveyor defined in claim 1, wherein a first anti-slip layer is provided between the top jaw of the first clamp and the top surface of the belt.

3. The belt conveyor defined in claim 2, wherein the first anti-slip layer includes an adhesive.

4. The belt conveyor defined in claim 3, wherein the adhesive is a glue.

5. The belt conveyor defined in claim 3, wherein the glue is applied on the top surface of the belt conveyor between the forward and rearward stress distribution extensions of the top jaw of the first clamp.

6. The belt conveyor defined in claim 1, wherein each of the anchors includes a second clamp, the first and second clamps of each anchor being mounted at a predetermined axial distance from one another to respectively provide front and rear attachment points for an associated one of the cant engaging members, the belt being free to move between the first and second clamps.

7. The belt conveyor defined in claim 6, wherein the second clamp has a top jaw and a bottom jaw, and wherein the top jaw has forward and rearward stress distribution extensions respectively projecting forwardly and rearwardly from an anchoring point of the second clamp.

8. The belt conveyor defined in claim 6, wherein a second anti-slip layer is provided between the top jaw of the second clamp and the top surface of the belt.

9. The belt conveyor defined in claim 6, wherein transversally extending pins project from opposed sides of the top jaw member of the second clamp for releasable engagement in corresponding seats defined in the associated one of the cant engaging members.

10. The belt conveyor defined in claim 9, wherein a transversal bore extends through the top jaw of the first clamp for registry with corresponding mounting holes defined in the associated one of the cant engaging members, and wherein a pin is insertable through said mounting holes and the transversal bore for detachably securing the associated one of the cant engaging members to the first clamp.

11. The belt conveyor defined in claim 1, wherein at one of said top and bottom jaws has a pair of transversally spaced-apart shoulders for receiving the belt therebetween, the fasteners being operatively engageable with the shoulders.

12. The belt conveyor defined in claim 11, wherein the fasteners include clamping bolts threadably engageable with threaded holes defined in the shoulders.

13. The belt conveyor defined in claim 1, wherein each cant engaging member has a front pushing side and a back abutment side, and wherein at least one of the front pushing side and the back abutment side is provided with a replaceable wear plate.

14. The belt conveyor defined in claim 13, wherein the replaceable wear plate is slidably insertable in corresponding slots defined in the at least one of the front pushing side and the back abutment side of each cant engaging member.

15. The belt conveyor defined in claim 1, wherein each cant engaging member has a main body having a base portion, an upwardly protruding portion extending from the base portion, and a sleeve member fitted over the upwardly protruding member, the sleeve member being urged in a forward position relative to the upwardly protruding portion by at least two vertically spaced-apart springs mounted on respective pins extending from a back plate disposed between the sleeve member and the upwardly protruding portion.

16. The belt conveyor defined in claim 15, wherein said back plate is slidably mounted on top and bottom guide pins extending through corresponding holes defined in the upwardly protruding portion and the sleeve member.

17. An anchor for mounting a cant engaging member on a belt of a conveyor, the anchor comprising a front clamp and a rear clamp adapted to be mounted at a predetermined axial distance from one another on the belt, the front clamp and the rear clamp each including a top jaw and a bottom jaw respectively configured for engagement with a top surface and a bottom surface of the belt, the top and bottom jaws having attachment portions projecting laterally outwardly from opposed sides of the belt, and fasteners engageable with the attachment portions for drawing the top and bottom jaws tightly against the top and bottom surfaces of the belt.

18. The anchor defined in claim 17, wherein front and rear anti-slip layers are respectively provided between the top jaw of the front clamp and the belt and the top jaw of the rear clamp and the belt.

19. The anchor defined in claim 17, wherein the top jaw of each the front and rear clamps has forward and rearward stress distribution extensions projecting respectively axially forwardly and rearwardly relative to the fasteners, the belt having a freedom of movement relative to the forward and rearward stress distribution extensions.

20. A cant engaging member for mounting on a belt of a conveyor, the cant engaging member comprising a main body having a base, an anchor releasably engageable with the base of the main body, the anchor including a first clamp having a top jaw and a bottom jaw respectively configured for engagement with a top surface and a bottom surface of the belt, and fasteners engaged with the top and bottom jaws on opposed lateral sides of the belt for selectively closing the top and bottom jaws in clamping engagement with the belt.

\* \* \* \* \*